United States Patent [19]

Serizawa et al.

[11] Patent Number: 5,097,917
[45] Date of Patent: Mar. 24, 1992

[54] STEERING SYSTEM OF VEHICLE

[75] Inventors: Mitsuya Serizawa; Makoto Sato; Yoshimitu Akuta, all of Tochigi, Japan

[73] Assignee: Honda Giken Kogyo Kabushiki Kaisha, Tokyo, Japan

[21] Appl. No.: 289,213

[22] Filed: Dec. 23, 1988

[30] Foreign Application Priority Data

Dec. 26, 1987 [JP] Japan ................... 62-331083
Dec. 26, 1987 [JP] Japan ................... 62-331084

[51] Int. Cl.$^5$ .................. B62D 5/04; B60Q 1/00
[52] U.S. Cl. .................... 180/79.1; 340/465
[58] Field of Search ........... 180/79.1, 140, 141, 180/142, 143; 340/465

[56] References Cited

U.S. PATENT DOCUMENTS

| | | | |
|---|---|---|---|
| 3,338,328 | 8/1967 | Cataldo | 180/79.1 |
| 3,882,953 | 5/1975 | Maisch | 180/79.1 X |
| 3,944,014 | 3/1976 | Maisch et al. | 180/79.1 |
| 4,624,334 | 11/1986 | Kelledes et al. | 180/79.1 |
| 4,771,843 | 9/1988 | Shimizu | 180/79.1 |
| 4,832,149 | 5/1989 | Degonde | 180/140 X |
| 4,834,205 | 5/1989 | Mizuno et al. | 180/79.1 X |
| 4,836,319 | 6/1989 | Haseda et al. | 180/79.1 X |
| 4,853,672 | 8/1989 | Yasuda et al. | 180/79.1 |
| 4,869,335 | 9/1989 | Takahashi | 180/79.1 |
| 4,871,040 | 10/1989 | Zuraski et al. | 180/79.1 |

FOREIGN PATENT DOCUMENTS

| | | | |
|---|---|---|---|
| 3536563 | 4/1986 | Fed. Rep. of Germany | 180/79.1 |
| 82669 | 7/1981 | Japan | 180/79.1 |
| 43473 | 3/1985 | Japan | |
| 742232 | 6/1980 | U.S.S.R. | 180/79.1 |
| 766941 | 9/1980 | U.S.S.R. | 180/79.1 |
| 933525 | 6/1982 | U.S.S.R. | 180/79.1 |
| 1134454 | 1/1985 | U.S.S.R. | 180/79.1 |

Primary Examiner—Mitchell J. Hill
Attorney, Agent, or Firm—Irving M. Weiner; Joseph P. Carrier; Pamela S. Burt

[57] ABSTRACT

A steering system for a vehicle includes a steering mechanism mechanically separated form a steering handle and having a motor for steering road wheels, a steering detector for detecting a steering operation of the handle, a steered angle sensor for detecting steered angles of the road wheels, and a control circuit mechanism for driving the motor to thereby steer the road wheels in response to detected signals from the steering detector and steered angle sensor. The steered angle sensor comprises a measuring member which makes rotational movements in proportion to the steered angles of the road wheels and occupies a constant space relative to the vehicle.

8 Claims, 8 Drawing Sheets

STEERING SYSTEM OF VEHICLE

BACKGROUND OF THE INVENTION

1. Field of the Invention

The present invention relates to a steering system of a vehicle, particularly, it relates to a steering system of a vehicle in which a steering handle and steering mechanisms of wheels are separated mechanically.

2. Description of the Relevant Art

In Japanese Utility Model Patent Application Laid Open No. 43473/1985 (laid open to public inspection on Mar. 27, 1985) a steering system of a vehicle in which a steering handle and steering mechanisms of road wheels are mechanically separated is disclosed. In this steering system, a steering sensor for detecting steering operation is provided on the steering handle. In a front wheel steering mechanism and a rear wheel steering mechanism, motors for driving steering wheels and steered angle sensors for detecting steered angles of the steered wheels are disposed respectively. The front and rear steering mechanism motors are energized in response to output signals from the steering sensors, front and rear wheel steered angle sensors, a speed sensor etc., whereby the front and rear wheels are steered.

In the aforesaid Japanese Utility Model Patent Application Laid Open No. 43473/1985, since the steering handle and the steering mechanisms of the wheels are separated mechanically, the whole steering system can be freely arranged.

In the steering system aforementioned, however, sensors for detecting steered angles of the front and rear wheels are constituted by potentiometers. Thus, at least, for example, a space for partial displacement of an output rod interposed between the motor and wheels is occupied by the potentiometer. As a result, the front and rear steering mechanisms tend to become large. Moreover, since output of the potentiometer is an analog signal, its accuracy is apt to become problematic. In this respect, the problem of accuracy of the detect signal can be solved if a digital linear displacement meter is used in place of the potentiometer. However, while the digital linear displacement meter is relatively costly, the trend of the large-sized steering mechanism still remains.

In view of the problems in the conventional steering system of the vehicle as aforementioned, the present invention has been devised to solve them effectively.

SUBJECT MATTER OF THE INVENTION

It is an object of the present invention to provide a steering system of a vehicle which is, in the steering system of the vehicle in which a steering handle and steering mechanism are separated mechanically, capable of detecting wheel steered angles accurately with less expensive mechanisms while restraining the steering mechanisms from becoming large.

In order to attain the aforesaid object, according to the present invention, there is provided a steering system for a vehicle having a steering handle, a steering mechanism mechanically separated from said steering handle and having a motor for steering road wheels of the vehicle, a steering detector for detecting steering operation of the handle and producing a steering operation signal, a steered angle sensor for detecting steered angles of the road wheels and producing a steered angle signal, and control circuit means for driving the motor of the steering mechanism in response to detected signals from said steering detector and said steered angle sensor to thereby steer said road wheels, wherein: said steered angle sensor comprises a measuring member which makes rotational movements in proportion to said steered angles of said road wheels and has a stationary occupying space.

Other objects, features and advantages of the present invention will become more apparent from the following description of the preferred embodiment of the present invention when considered in connection with the accompanying drawings.

DESCRIPTION OF THE PREFERRED EMBODIMENTS

Figure 1:
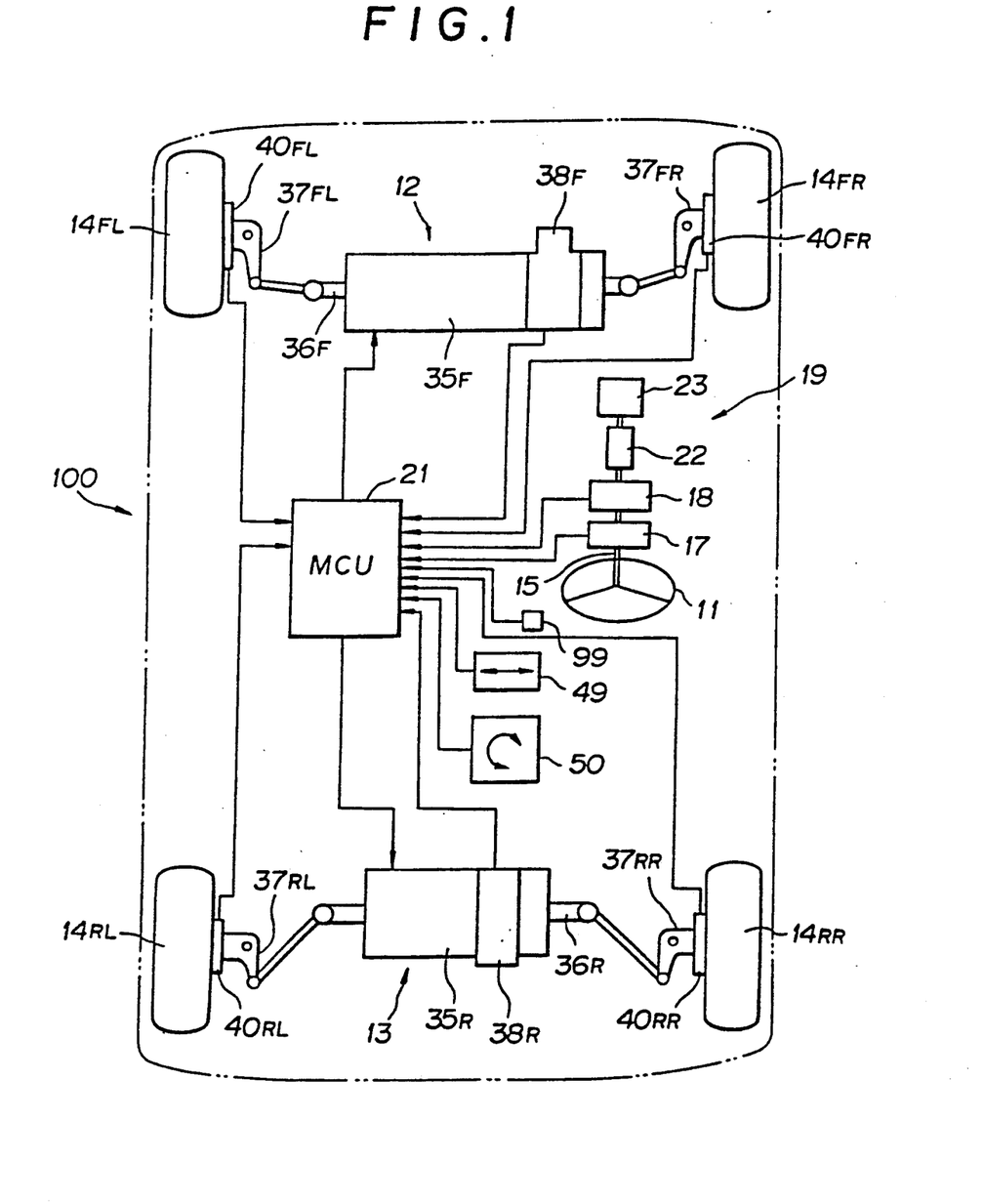
FIG. 1 is a schematic plan view of a vehicle including a steering system according to the preferred embodiment of the present invention.
Figure 2:
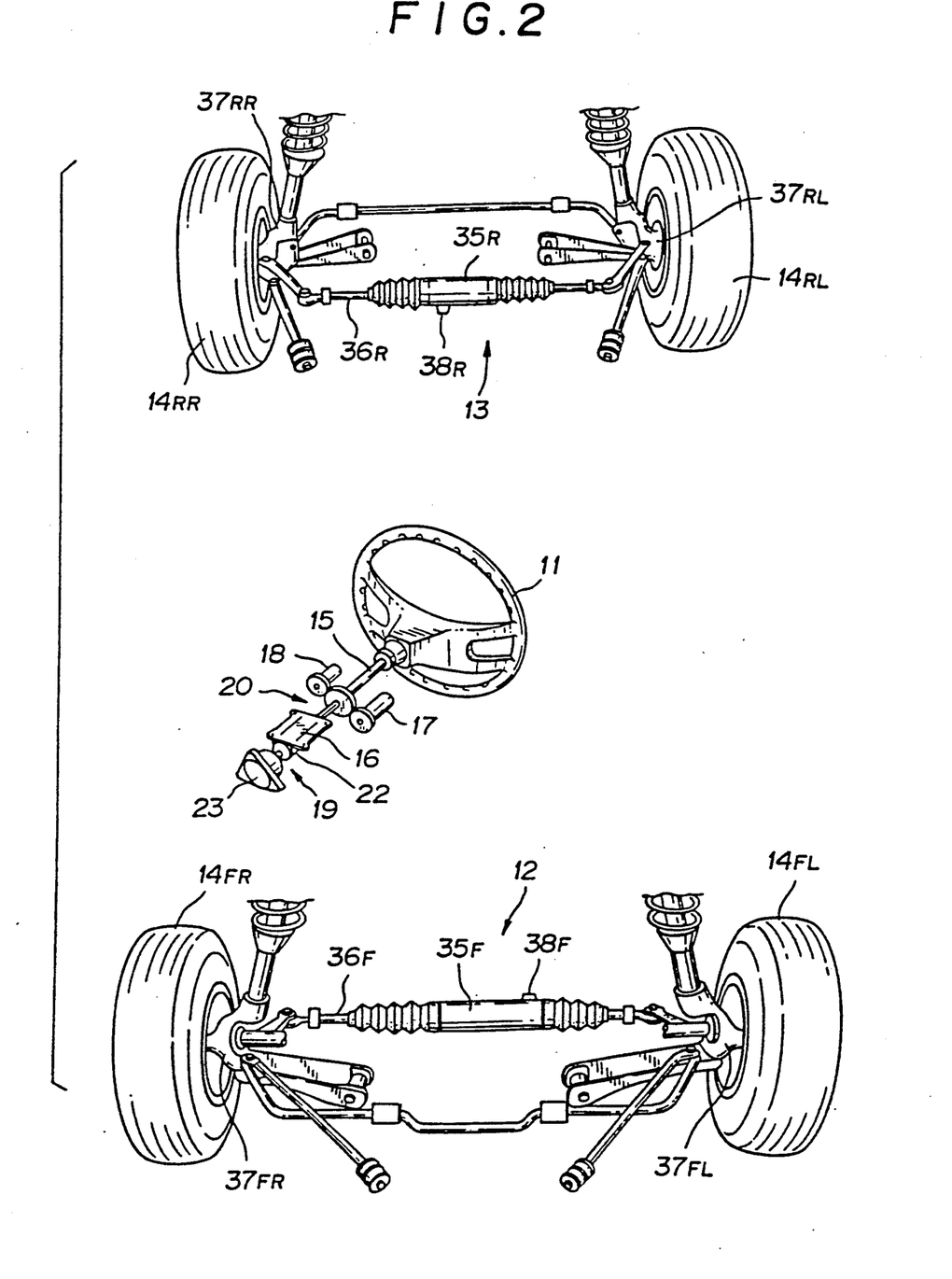
FIG. 2 is a perspective view of a front wheel steering mechanism and a rear wheel steering mechanism in the steering system.

In FIGS. 1 and 2, reference numeral 11 indicates a steering handle, 12 denotes a front wheel steering mechanism for steering right and left front wheels 14FR, 14FL, 13 is a rear wheel steering mechanism for steering right and left rear wheels 14RR, 14RL. The steering handle 11, front wheel steering mechanism 12 and rear wheel steering mechanism 13 are independent and separated mechanically from one another. The steering handle 11, steering mechanisms 12, 13, a control unit 21 to be described later, and so on, constitute a steering system 100 of a vehicle according to the preferred embodiment of the present invention.

The steering handle 11 is secured to the upper end of the steering shaft 15, which is supported rotatably by a car body via a bracket 16. In the midway of the steering shaft 15, an encoder 17 and a tachogenerator 18 are installed, and at the lower end thereof, a reaction force generator 19 having a spring element 22 and dampening element 23 is provided. The encoder 17 is a steering angle sensor which is coupled to the steering shaft 15 via a gearing mechanism 20 for detecting a steering angle $\theta h$, and the tachogenerator 18 is a steering speed sensor which is coupled to the steering shaft 15 via the gearing mechanism 20 for detecting a steering speed $\dot{\theta}h$. The encoder 17 and tachogenerator 18 are connected to a microcomputer unit (MCU) 21 as a control circuit.

The encoder 17 outputs the detect signal representing the steering angle $\theta h$ to the MCU21, and the tachogenerator 18 outputs the detect signal representing the steering speed $\dot{\theta}h$ to the MCU21. In the figure, reference numeral 99 indicates an ignition key.

The spring element 22 of the reaction force generator 19 is constituted by a torsion spring and the like and urges the steering handle 11 to a neutral position. The dampening element 23 is constituted by a damper and the like using a viscous fluid and generates a resistance force corresponding to the steering speed $\dot{\theta}h$ of the steering handle 11. The reaction force generator 19 urges the handle 11 normally to the neutral position, and gives a suitable reaction force to steering operation of the driver for the steering handle 11. If the driver releases his hand from the handle 11, it is restored to the neutral position gently by the reaction force generator 19.

Figure 3:
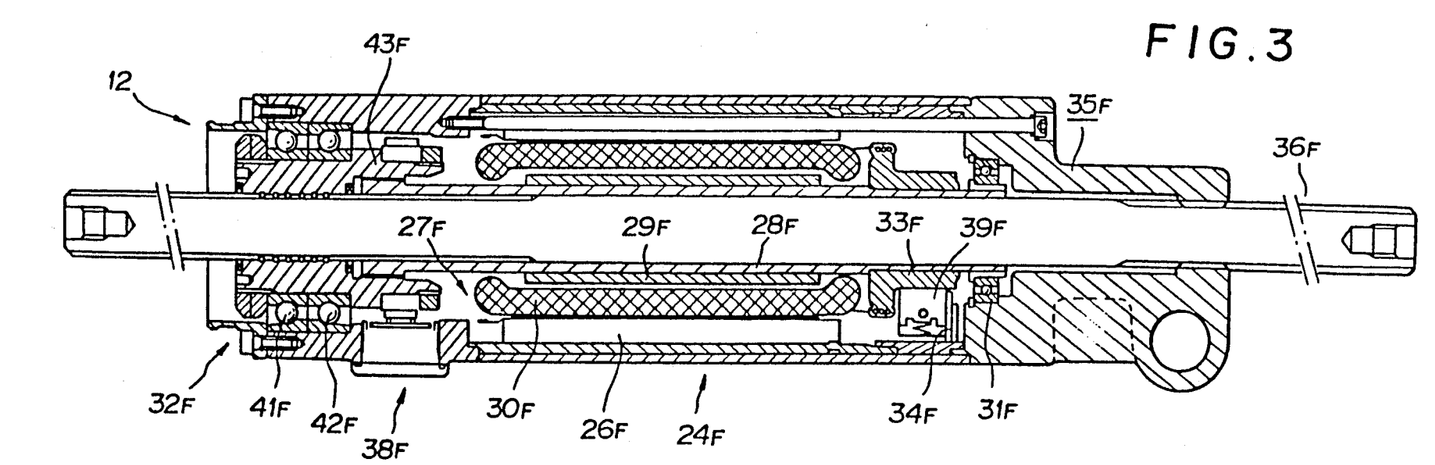
FIG. 3 is a sectional view of essential portions of the front wheel steering mechanism.

As particularly shown in FIG. 3, in the front wheel steering mechanism 12, a rod 36F is supported movably in the lateral direction of the vehicle and fixed radially by a hollow box 35F mounted on the car body laterally, and a motor 24F is installed in the box 35F coaxially with the rod 36. In the box 35F, an encoder 38F for detecting the front wheel steered angle $\delta f$ is disposed. Opposite ends of the rod 36F are coupled respectively to knuckles 37FR, 37FL of the right and left front wheels 14FR, 14FL via tie-rods. The motor 24F is constituted by a field magnet 26F secured to the inner wall of the box 35F and a rotor 27F interposed rotatably between the field magnet 26F and rod 36F. The rotor 27F comprises a cylindrical output shaft 28F fitted rotatably to the rod 36F and a laminated iron core 29F secured coaxially and integrally to the periphery of the output shaft 28F. In the iron core 29F, skew grooves are formed and an armature winding 30F is wound in multiplex winding. The output shaft 28F, as shown in FIG. 3, is supported by the box 35F rotatably at its right end via a ball bearing 31F, and coupled to the rod 36F at its left end via a ball-nut mechanism 32F so that power is transferable. The armature winding 30F is connected to the MCU21 via a commutator 33F secured to the output shaft 28F on the right hand part in the figure, and a brush 39F supported in a holder 34F and contacted resiliently to the commutator 33F. The ball-nut mechanism 32F is supported by the box 35F via ball bearings 41F, 42F, and includes a generally cylindrical ball nut 43F engaged to the output shaft 28F of the motor 24F at the left end in the figure by a spline and the like, and a number of balls interposed movably between ball grooves formed in the inner circumferential surface of the ball nut 43F and ball grooves formed in the peripheral surface of the rod 36F. The ball nut 43F rotates together with the output shaft 28F of the motor 24F, and is stationary axially to the output rod 36F. From another viewpoint, the occupying space of the ball nut 43F is stationary. On the peripheral surface of the rod 36F, ball grooves are formed throughout the range corresponding to the sliding distance in the lateral direction of the vehicle. Rotational quantity of the ball nut 43F is proportional to the axial movement of the output shaft 36F or the wheel steered angles.

Figure 5:
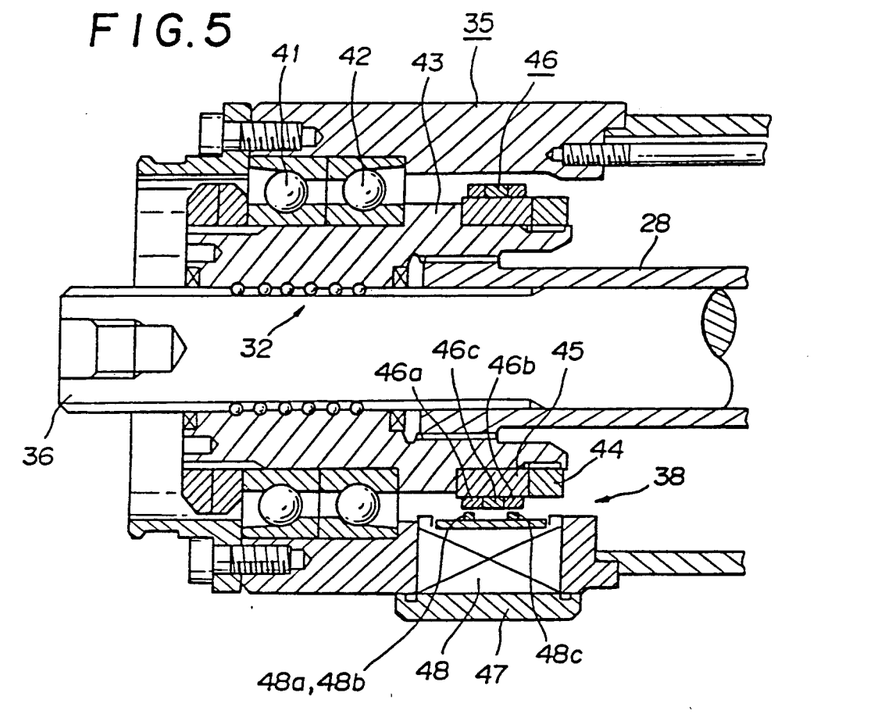
FIG. 5 is an enlarged sectional view of an encoder constituting a portion of a steered angle sensor of the front wheel steering mechanism.

FIG. 5 shows essential portions of a steered angle sensor of the front wheel steering mechanism 12. Since the construction shown in FIG. 5 is in common with those of the rear wheel steering mechanism 13 in description, a suffix letter F of the parts numeral in FIG. 3 will be omitted.

Figure 8:
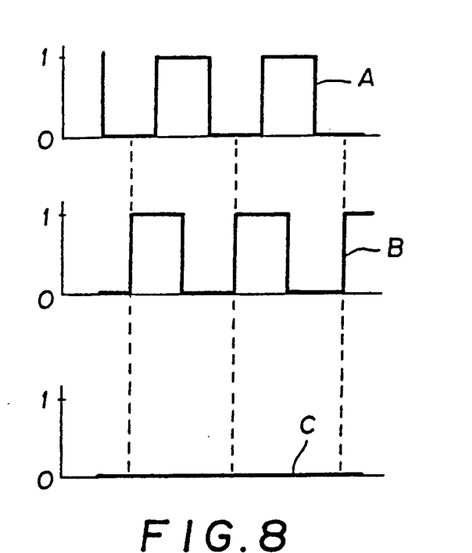
FIGS. 8 and 9 are timing charts of the output signal of a steered angle sensor including the encoder.
Figure 9:
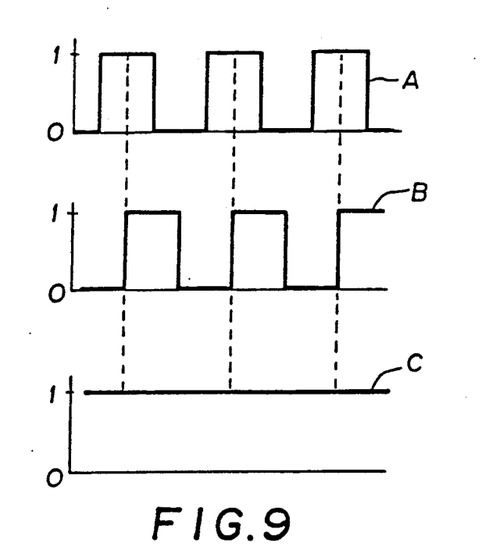

As particularly shown in FIG. 5, the encoder 38 includes a cylindrical magnet holding member 45 fixed to the periphery of the ball nut 43 of the ball-nut mechanism 32 by a lock nut 44, a generally cylindrical permanent magnet 46 fixed to the periphery of the holding member 45 and rotating integrally with the ball nut 43, and a sensor body 48 mounted on the box 35 by a bracket 47 and connected to the MCU21. The magnet 46 includes a main magnetic-pole portion 46a wherein a large number (e.g. 60 poles) of magnetic poles are arranged in the rotating direction with constant intervals, and a submagnetic-pole portion 46b wherein a small number (e.g. two poles) of magnetic poles are arranged in the rotating direction. The magnetic pole portions 46a, 46b are constituted by connecting axially via a spacer 46c. The sensor body 48 has magnetic-sensitive elements 48a, 48b such as an MR element whose resistance value varies by the magnetic variation or a hall device which generates electric voltage by variation of the magnetic force, and detective of momentum of the magnet 46. The sensor body 48 is connected to the MCU21 and outputs a signal indicating the rotation of the magnet 46 to the MCU21. The magnetic-sensitive elements 48a, 48b of the sensor body 48 are arranged with a predetermined interval in the rotating direction at a phase difference of 90° opposing to the main magnetic-pole portion 46a of the magnet 46. One magnetic-sensitive element 48c is disposed opposing to the sub-magnetic-pole portion 46b of the magnet 46. As shown in FIGS. 8 and 9, two magnetic sensitive elements 48a, 48b detect the magnetic variation due to the rotation of the main magnetic-pole portion 46a of the magnet 46, and output rectangular pulse detecting signals A, B having the phase difference of 90° respectively. The pulse signals A, B are inputted to a counter (not shown). Since the pulse signals are generated at every rotation of the ball nut 43 by a small angle, a high resolution can be obtained. One magnetic-sensitive element 48c detects the magnetic variation by the sub-magnetic-pole portion 46b of the magnet 46 and outputs a correcting pulse signal to the MCU21. The pulse signals A, B are inputted further to D-input and CLK terminals of a D flip-flop (not shown) of the MCU21. Thus, the output signal C of the D flip-flop has either a low potential level '0' or a high potential level '1' responsive to the phase difference between the signals A, B. That is, when the signal B is ahead of the signal A by the phase difference of 90° by steering the wheels in one direction, as shown in FIG. 8, the output signal C of the D flip-flop is maintained in the low level potential '0'. Conversely, when the wheels are steered in the other direction and the signal B is behind the signal A by the phase difference of 90°, as shown in FIG. 9, the output signal C of the D flip-flop is maintained in the high potential level '1'. Thus, the phase difference between the signals A, B, namely, the output level of the signal C represents the steered direction of the wheels. As will be understood, the encoder 38 occupies a constant space relative to the vehicle; although the magnet 46 and the holding member 45 rotate with the ball nut 43 in proportion to the steered angles of the road wheels.

Figure 4:
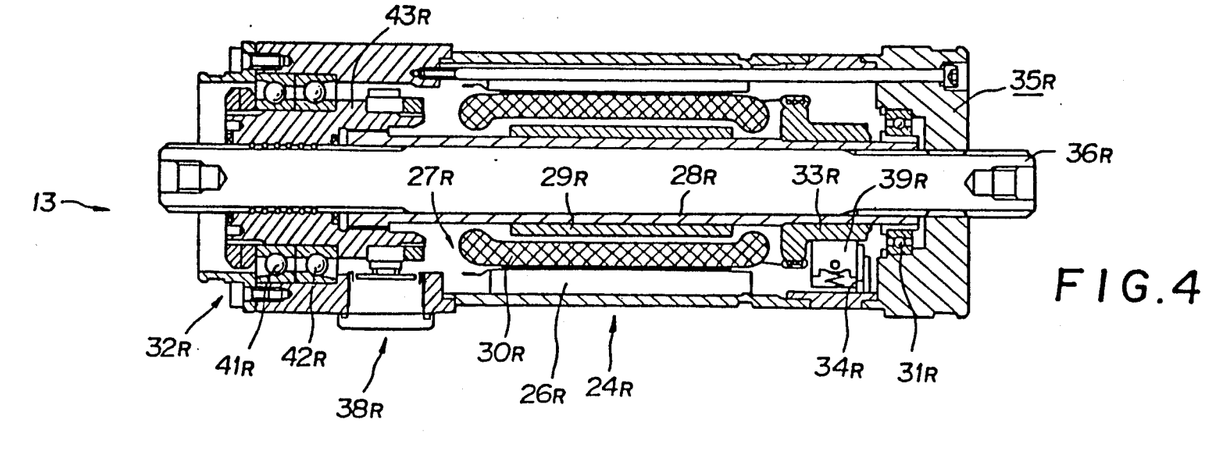
FIG. 4 is a sectional view of essential portions of the rear wheel steering mechanism.

As shown in FIG. 4, the rear wheel steering mechanism 13, the same as the front wheel steering mechanism 12, comprises a box 35R supported by the car body and a rod 36R supported movably in the lateral direction of the vehicle and fixed radially by the box 35R, and opposite ends of the rod 36R are connected to knuckles 37RR, 37RL of right and left rear wheels 14RR, 14RL.

In the box 35R, a motor 24R connected to the MCU21 is provided coaxially with the rod 36R, and an output shaft 28R of the motor 24R is coupled to the rod 36R via a ball-screw mechanism 32R, whereby the rear wheels 14RL, 14RR are steered by the motor 24R. Steered angles of the rear wheels 14RL, 14RR are detected by an encoder 38R. Since the rear wheel steering mechanism 13 has basically the same construction as the front wheel steering mechanism 12 except the smaller output and stroke of the rod 36R, its description will be omitted by affixing R to the like reference numeral of the parts corresponding to the front wheel steering mechanism 12. In FIGS. 3 and 4, the front and rear wheel steering mechanisms 12, 13 are drawn in a generally equal contraction scale for comparison.

In the following, corresponding component parts of the front wheel steering mechanism 12 and the rear wheel steering mechanism 13 are represented by numerals without affixing letters, and the front wheels 14FL, 14FR and the rear wheels 14RL, 14RR are represented by reference numeral 14.

The MCU21 includes a CPU (not shown) and further driving circuits etc. which energize the motor 24 of respective steering mechanisms 12, 13 in response to the output signal of the CPU. To the MCU21, the aforesaid encoder 17 for the steering handle, tachogenerator 18 and encoders 38 of respective steering mechanisms 12, 13 are connected. A lateral acceleration sensor 49, yaw-rate sensor 50 and speed sensors, 40FL, 40FR, 40RL, 40RR disposed on respective front, rear, right and left wheels 14FL, 14FR, 14RL, 14RR are further connected to the MCU21. The MCU21 includes the D flip-flop and counter as aforementioned and processes the output signal of respective encoders 38. Respective speed sensors 40 (represented by numeral without affixing letter) detect the vehicle speed V and output the signal representing the vehicle speed V to the MCU21. Similarly, the lateral acceleration sensor 49 outputs the signal representing the lateral acceleration y to the MCU21, and the yaw-rate sensor 50 outputs the signal representing the yaw-rate $\phi$ to the MCU21. The MCU21 processes the input signals in the CPU to decide target control values such as target steering angles, steering forces etc. respectively for the front and rear wheels, and outputs the control signal representing the target control values to the driving circuit. The driving circuit energizes the motor 24F of the front wheel steering mechanism 12 and the motor 24R of the rear wheel steering mechanism 13 in response to the control signal inputted from the CPU.

Next, functional operation of the steering system 100 will be explained with reference to FIGS. 6 and 7. Since operations of the steering system 100 for the front wheels 14FL, 14FR and the rear wheels 14RL, 14RR are basically the same, in the following description, they are represented generically by the steering wheels 14.

Figure 6:
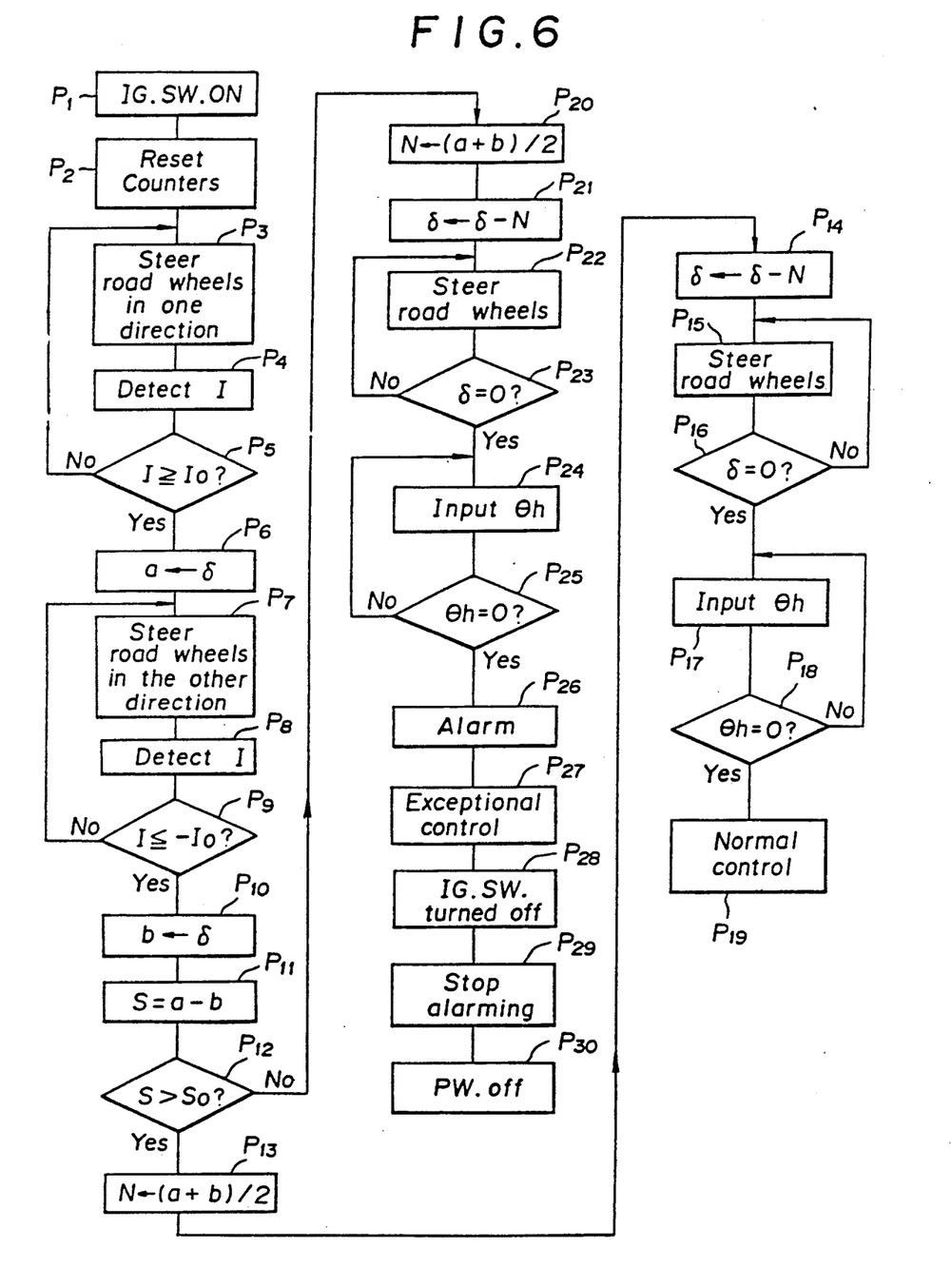
FIG. 6 is a schematic flow chart of wheel neutral position restoring processing effected by a control circuit of the steering system when an ignition switch is turned on, FIG. 7 is a schematic flow chart of wheel neutral position restoring processing effected by the control circuit when an ignition switch is turned off.
Figure 7:
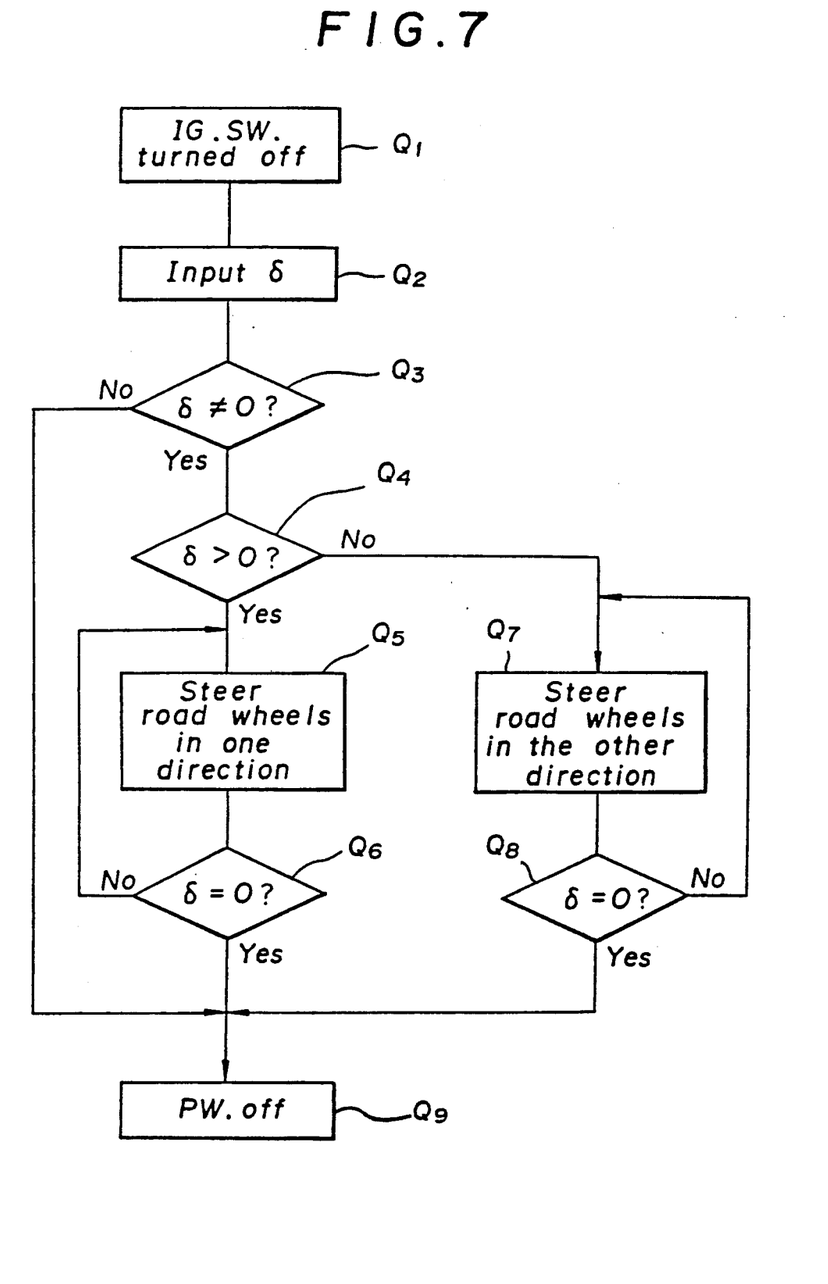

In the front and rear steering system 100, by the CPU of the MCU21, a start adjustment is effected in Steps P1–P30 of FIG. 6 when the ignition switch is turned on, and when it is turned off, an end adjustment is performed in Steps Q1–Q9 of FIG. 7.

In FIG. 6, when the ignition switch is turned on (P1), a counter for counting pulses of the output signals A and B of the encoder 38 is reset (P2). In Step P2, irrespective of the position of the handle 11 at that time, the handle position is supposed to be in a neutral position. Thereafter, the CPU energizes the motor 24 to steer the wheels 14 to the left or right (P3), and stores a steered angle $\delta$ when the electric current I applied to the motor 24 exceeds a predetermined value I0, or a cumulative value of the counter, as one maximum steering angle a (P4, P5, P6). The electric current I increases suddenly at an original marginal steering position of the steering system or when the wheel contacts to the curb and the like. By Step P3–P6, the marginal steering position of the wheels 14 in one direction can be obtained.

Thereafter, similarly, the CPU energizes the motor 24 to steer the wheels 14 in the other direction (P7), and stores a steered angle $\delta$ when the electric current I applied to the motor 24 exceeds a predetermined value-I0 as the other maximum steering angle b (P8, P9, P10). By Steps P7-P10, the marginal steering position of the wheels 14 in the other direction can be obtained.

Then, the CPU calculates a steering range S by subtracting the maximum steering angle b in the other direction from the maximum steering angle a in one direction aforementioned, and determines whether the steering range S is larger than a predetermined value S0 (P11, P12). If the steering range S thus obtained is larger than the predetermined value S0, the CPU calculates the mean value N of the aforesaid maximum steering angles a, b, or a true neutral position (P13), and corrects the cumulative value of the counter or the detect steered angle $\delta$ by using the mean value N (P14). By processing in Step P14, the cumulative value of the counter shows the correct steered angle $\delta$. The CPU then energizes the motor 24 to steer the wheels 14 to the true neutral position in response to the value of the corrected steered angle $\delta$ (P15, P16). Then, the CPU detects the steering angle $\theta h$ of the steering handle 11 and confirms whether the steering handle 11 is restored to the neutral position ($\theta h=0$) by the spring element 22 (P17, P18), and if it is in the neutral position, goes to the normal control (P19).

In the normal control in Step P19, the steered angle $\delta$, steering force etc. are decided in response to detect signals from respective sensors and the wheels 14 are steered.

Contents of the normal control in Step P19 will be described later.

While, when the wheel 14 contacts obstacles such as the curb and the like, and it is determined that the steering range S is below the predetermined value S0 (P12), the CPU obtains the mean value N of maximum steering angles a, b (P20) to correct the cumulative value of the counter or the detect steered angle $\delta$ by the mean value N (P21), and energizes the motor 24 to steer the wheels 14 to the neutral position of the steering range S at that time (P22, P23). Furthermore, the CPU confirms that the steering handle 11 is at the neutral position (P24, P25) based on the signal Oh from the encoder 17 and the signal Oh from the tachogenerator 18. Thereafter, the CPU gives a warning or alarm by a buzzer, lamp or the like (P26) and goes to the exceptional control with restriction (P27). In the exceptional control (P27), the CPU restrictively sets the vehicle speed or the possible running distance, and after the vehicle has moved a predetermined distance, processes to urge reinitialization etc. If the ignition switch is turned off (P28) after such control (P27), the CPU stops the alarm or warning (P29) and turns off the power source (P30).

In the end adjustment, as shown in FIG. 7, if the ignition switch is turned off (Q1) after the normal control is effected once in Step P19 of FIG. 6, the steered angle $\delta$ of the wheels 14 is read from the cumulative counter value or the steering angle $\theta h$ of the steering wheel 11 (Q2). If the steered angle δ is not zero or the wheels 14 are not in the neutral position (Q3), the CPU energizes the motor 24 to steer the wheels 14 to the neutral position (Q4, Q5, Q6, Q7, Q8), and thereafter turns off the power source (Q9).

In the steering system 100 aforementioned, the steered angle δ of the wheels 14 is detected by an increment-type encoder 38 disposed in the stationary occupying space and including the magnet 46. The encoder 38 does not need to occupy the space for displacement of the output rod 36, thus dimensions of the steering mechanisms 12, 13 in the lateral direction are hardly increased. Since the cumulative counter value based upon the output signal of the encoder 38 is the digital signal, the steered angle δ can be obtained as a very accurate digital signal and prevents the steering mechanisms 12, 13 from becoming large. Besides, the encoder 38 has a simple construction, so that it can be provided at a low cost. Consequently, the total cost of the steering system 100 can be reduced.

The neutral position (δf, δf=0) of the wheels 14 is detected newly whenever the ignition switch is turned on as shown in FIG. 6. Thus, the steered angles; δf, δr of the wheels 14 are not necessary to be stored by, for example, a non-volatile memory while the ignition switch is turned off.

On the other hand, since the handle 11 is urged to the neutral position by the reaction force generator 19, it is restored to the neutral position automatically once the driver leaves the vehicle. As described hereinabove, the wheels are restored to the neutral position at ON/OFF of the ignition switch. That is, at ON/OFF of the ignition switch, the handle steering position and the wheel steered position are readjusted. Thus, the steering angle indicated by the steering handle will correspond to the actual steering angle of the road wheels when starting a steering operation of the vehicle. In this respect, it is preferable, while Steps P2-P18 and P2-P26 of FIG. 6 are processed, if "angle adjusting operation of the steering handle and wheels" is notified to the driver by a suitable display such as a lamp, voice generator and the like. As will be understood from the foregoing discussion, the position restoring processing of FIGS. 6-7 effected by the CPU of the MCU 21 and the reaction force generator 19 collectively constitute an angle adjusting means for driving the steering handle and the road wheels to thereby render a steering angle of the steering handle and a steered angle of the road wheels into correspondence with each other at the occurrence of at least one of an ON operation and an OFF operation of an ignition switch of the vehicle.

In the aforesaid relevant art, if the steering handle is operated for any reason while the ignition switch is off, the handle remaines at the steered position, while the wheels are not steered. Thus, there is the possibility that the steering angle indicated by the steering handle will not correspond to the actual steering angle of the road wheels when starting the steering operation next.

In the above description, the wheels 14 are restored in the neutral position at both ON and OFF of the ignition switch. However, restoring operation of the wheels 14 to the neutral position is sufficient to be effected, at least, either at ON or OFF of the ignition switch. The encoder 38 is not necessarily disposed at the location mentioned above.

Next, normal control effected in Step P19 of FIG. 6 will be explained with reference to FIGS. 10 to 13.

As already described, the CPU of the MCU21 calculates input signals from respective sensors 17, 18, 40, 49, 50 to decide target control values of respective target steered angles and target steering forces of the front wheels 14FL, 14FR and the rear wheels 14RL, 14RR, and outputs control signals representing the target control values to the driving circuits of the motors. The driving circuits energize the motor 24F of the front wheel steering mechanism 12 and the motor 24R of the rear wheel steering mechanism 13 in response to the detected signals from acceleration sensor 49 and yaw-rate sensor 50 which correspond respectively to state quantity detecting means. The MCU21 corresponds to target state quantity setting means and rear wheel steered angle deciding means.

In FIGS. 10, 11, 12 and 13, various functions performed by the MCU21 are shown in block diagrams as independent construction elements for the convenience of explanation.

Figure 10:
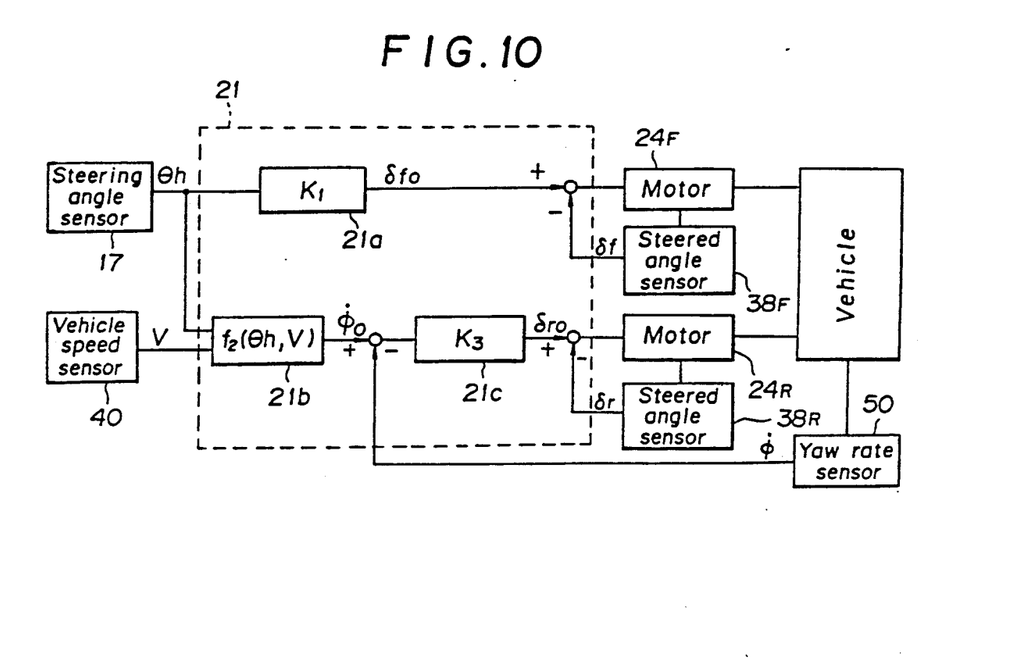
FIGS. 10 through 13 are functional block diagrams of four kinds of normal control modes in the steering system.

FIG. 10 shows the first embodiment of the normal control P19. In the first embodiment, the yaw-rate sensor 50 is used as state quantity detecting means.

In this embodiment, as to the front wheels 14FL, 14FR, based upon the handle steered angle $\theta h$ detected by the steering angle sensor 17, the target front wheel steered angle $\delta f_0$ ($\delta f_0 \propto K1.\theta h$: K1=constant) is decided by a front wheel target steered angle deciding device 21a of the MCU21. A true steered angle $\theta$ of the front wheels 14FL, 14FR is detected by the front wheel steered angle sensor 38F. The MCU21 energizes the motor 24F responsive to the deviation between the target steered angle $\delta f_0$ and the true steered angle $\delta f$, and drives the front wheels 14FL, 14FR by the motor 24F to steer to the target steered angle $\delta f_0$. As to the rear wheel 14RL, 14RR, based upon the handle steering angle $\theta h$ and vehicle speed V, the target yaw-rate $\phi_0$ is decided as a function $f_2$ of the handle steering angle $\theta h$ and vehicle speed V by a target yaw-rate deciding device 21b. An actual yaw-rate $\phi$ is detected by the yaw-rate sensor 50, and the rear wheel target steered angle $\delta r_0$ is decided by a rear wheel steered angle deciding device 21c responsive to the deviation between the target yaw-rate $\phi_0$ and the true yaw-rate $\phi$. A true steered angle $\delta r$ of the rear wheels 14RL, 14RR is detected by a rear wheel steered angle sensor 38R. The MCU21 energizes the motor 24R responsive to the deviation between the rear wheel target steered angle $\delta r_0$ and the true steered angle $\delta r$ to steer the rear wheels 14RL, 14RR to the target steered angle $\delta r_0$.

Now, in the front and rear wheel steering system according to Japanese Utility Model Patent Application Laid Open aforementioned, the rear wheel steered angle $\delta r$ is decided fixedly responsive to steering conditions such as the handle steering angle $\theta h$, vehicle speed V etc. Thus, there is the possibility that turning behavior of the vehicle changes by the operating conditions such as acceleration and deceleration, steering speed and so on. Conversely, even if the steering conditions of the vehicle are constant, if loading conditions, road conditions etc. are changed, there is a possibility that the turning behavior is influenced responsive to the changes. As a result, in order to obtain the turning behavior desired by the driver, the driver must correct the handle steering angle $\theta h$ additionally.

In the embodiment shown in FIG. 10, however, while the target steered angle $\delta f_0$ of the front wheels 14FL, 14FR is decided fixedly by the handle steering angle $\theta h$ and realized, target steered angle $\delta r_0$ of the rear wheels 14RL, 14RR is decided and realized to obtain the target yaw-rate $\dot{\phi}_0$ to be set based on the handle steering angle $\theta$h and vehicle speed V. Thus, ideal yaw-rate characteristics or steering characteristics can be obtained without being influenced by various factors such as the vehicle suspension geometry, a driving method of the front and rear wheels, weight distribution to the front and rear wheels and so on, and by changes of the loading condition of the vehicle. In the control method of FIG. 10, a high versatility applicable in the vehicle having different suspension specification, suspension type etc. can be obtained without changing the basic control method.

According to the control method of FIG. 10, the rear wheel steered angle $\delta$r is controlled responsive to the deviation between the yaw-rate $\dot{\phi}$ and the target yaw-rate $\dot{\phi}_0$ of the vehicle. Thus, even when the vehicle is subjected to disturbances such as side wind or the like, irrespective of operation of the steering handle 11, the rear wheels 14RL, 14RR are steered automatically and influence of the disturbance is reduced.

In the control method of FIG. 10, various target values are calculated and decided by the functions. However, the various target values can be set by a table look-up method using a memory map.

Figure 11:
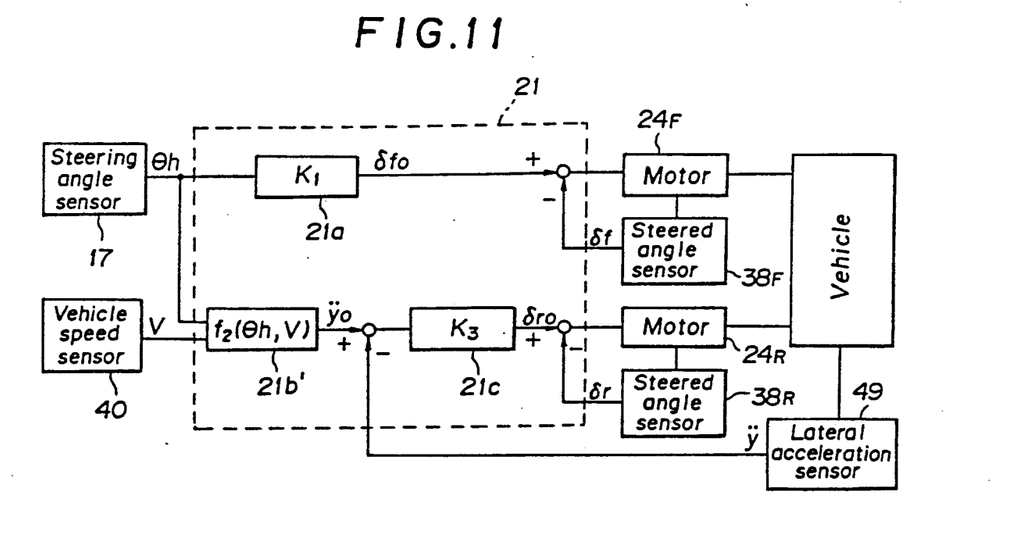
Figure 12:
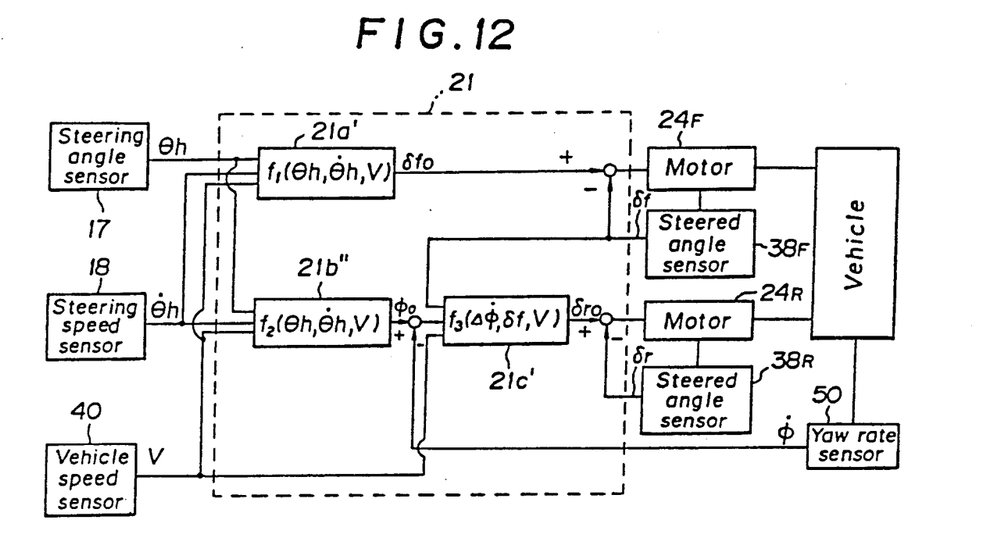
Figure 13:
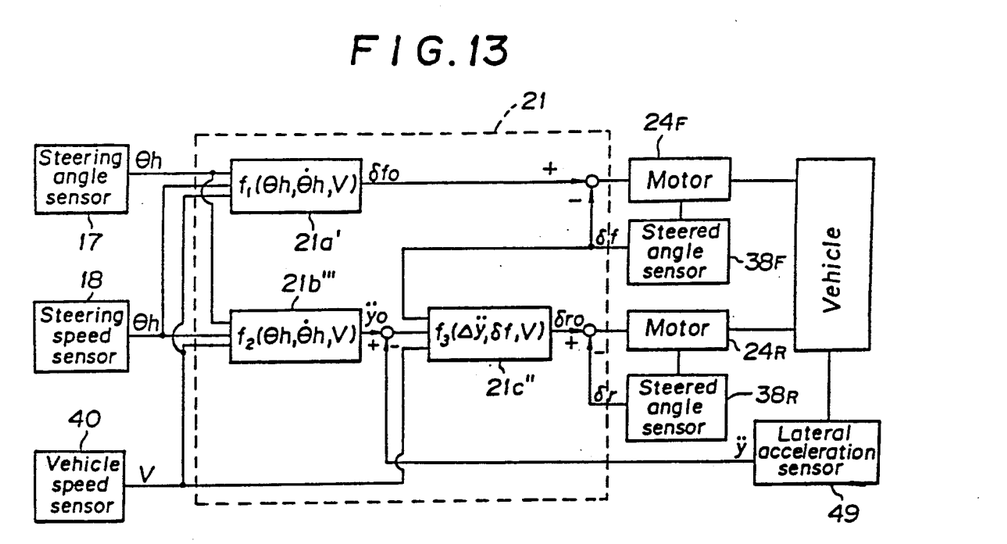

FIGS. 11, 12 and 13 show respectively second to fourth embodiments of the normal control. In the following, description will be omitted by showing like parts of the embodiment of FIG. 10 by like numerals.

In the control method of the second embodiment of FIG. 11, the lateral acceleration is employed as the vehicle state quantity, and the target lateral acceleration $_0$ is set by a target lateral acceleration deciding device 21b' in response to the handle steering angle $\theta$h and vehicle speed V. An actual lateral acceleration is detected by a lateral acceleration sensor 49. The target steering angle $\delta$r$_0$ of the rear wheels 14RL, 14RR is decided based on the deviation between the target lateral acceleration $_0$ and actual lateral acceleration .

In the third embodiment of FIG. 12, the target steered angle $\delta$f$_0$ of the front wheels 14FL, 14FR is decided as a function $f_1$ of the handle steering angle $\theta$h, steering speed $\dot{\theta}$h and vehicle speed V by a front wheel target steered angle deciding device 21a'. The target yaw-rate $\dot{\phi}_0$ is decided as a function $f_2$ of the handle steering angle $\theta$h, steering speed $\dot{\theta}$h and vehicle speed V by a target yaw-rate deciding device 21b''. The target steered angle $\delta$r$_0$ of the rear wheels 14RL, 14RR is decided by a rear wheel target steered angle deciding device 21c' based on the deviation $\Delta\dot{\phi}$ between the target yaw-rate $\dot{\phi}_0$ and the true yaw-rate $\dot{\phi}$; the true steered angle $\delta$f of the front wheels 14FL, 14FR; and the vehicle speed V.

In the third embodiment of FIG. 12, the target steered angle $\delta$r$_0$ of the rear wheels 14RL, 14RR is decided by considering the steering speed $\dot{\theta}$h and the true steered angle $\delta$f of the front wheels 14FL, 14FR. Thus, running conditions of the vehicle such as the friction coefficient of the road surface and the driver's will can be reflected for a comfortable steering feeling.

In the fourth embodiment of FIG. 13, as the vehicle state quantity, the lateral acceleration is employed. As same as the third embodiment of FIG. 12, the target lateral acceleration $_0$ is decided by a target lateral acceleration deciding device 21b as a function $f_2$ of the handle steering angle $\theta$h, steering speed $\dot{\theta}$h and vehicle speed V. The target steered angle $\delta$r$_0$ of the rear wheels 14RL, 14RR is decided by a rear wheel target steering angle deciding device 21c'' as a function $f_3$ of the deviation $\Delta$ between the target lateral acceleration $_0$ and true lateral acceleration ; true steered angle $\delta$f of the front wheels 14FL, 14FR; and vehicle speed V. Also, in the fourth embodiment, running conditions of the vehicle, drivers will, and so on, can be reflected on the vehicle behavior for a comfortable steering feeling.

The normal control method in FIGS. 10 to 13 is also applicable in the front and rear wheel steering system having a mechanical coupling between the steering handle and the steering mechanisms.

As described heretofore, according to the control methods in FIGS. 10 to 13, the target state quantity is decided in response to the steering conditions, and at the same time, the target steered angle $\delta$r$_0$ of the rear wheels is decided based on the deviation between the target state quantity and the actual state quantity. Thus, even when the loading state etc. are changed, an ideal state quantity satisfactory to the steering conditions can be obtained. The aforesaid control methods are readily applicable in the front and rear wheel steering system having different various vehicle factors of the suspension geometry etc., thus a high versatility can be obtained. Furthermore, state variations caused by the disturbance can be responded to without operating the steering handle.

Although there have been described what are at present considered to be the preferred embodiments of the present invention, it will be understood that the invention may be embodied in other specific forms without departing from spirit or essential characteristics thereof. The present embodiments are therefore to be considered in all aspects as illustrative, and not restrictive. The scope of the invention is indicated by the appended claims rather than by the foregoing description.

What is claimed is:

1. A steering system for vehicle having a steering handle, a steering mechanism mechanically separated from said steering handle and having a motor for steering road wheels of the vehicle, a steering sensor for detecting steering operation of the handle and producing a steering operation signal, a steered angle sensor for detecting steered angles of the road wheels and producing a steered angle signal, and control circuit means for driving the motor of the steering mechanism in response to detected signals from said steering sensor and said steered angle sensor to thereby steer said road wheels, wherein:

said steered angle sensor comprises a measuring member which makes rotational movements in proportion to said steered angles of said road wheels and occupies a constant space relative to said vehicle.

2. A steering system for a vehicle according to claim 1, wherein:

said measuring member of said steered angle sensor comprises a permanent magnet member which rotates in proportion to said steered angles of said road wheels and has a plurality of magnetic poles arranged in a rotational direction of said permanent magnet member, and said steered angle sensor further comprises a stationary magnet-sensitive element for detecting a rotational quantity of said permanent magnet member to output to said control circuit means.

3. A steering system for vehicle according to claim 2, wherein:

said control circuit means comprises means for correcting a wheel neutral position by driving said motor of said steering mechanism such that said road wheels are steered completely through a range of then possible steering angles of said road wheels, to thereby establish a correct neutral position of said road wheels to be detected by said steered angle sensor, in response to at least one of an ON operation of an OFF operation of an ignition switch of the vehicle.

4. A steering system for a vehicle according to claim 1, wherein:
said steering system further comprises means for normally urging said steering handle to its neutral position, and
said control circuit means comprises means for restoring a wheel neutral position by driving said motor to thereby restore said road wheels to neutral positions thereof, in response to at least one of an ON operation and an OFF of an ignition switch of the vehicle.

5. A steering system for a vehicle according to claim 1, wherein:
said steering mechanism comprises a front wheel steering mechanism and a rear wheel steering mechanism.

6. A steering system for a vehicle having a steering handle, a steering mechanism mechanically separated from said steering handle and having a motor for steering road wheels of said vehicle, a steering sensor for detecting steering operation of said steering handle and producing a steering operation signal, a steered angle sensor for detecting steered angles of said road wheels and producing a steered angle signal, and control circuit means for driving said motor of said steering mechanism in response to detected signals from said steering sensor and said steered angle sensor to thereby steer said road wheels, wherein:
said steering system comprises an angle adjusting means for driving at least one of said steering handle and said road wheels to thereby render a steering angle of said steering handle and a steered angle of said road wheels into correspondence with each other, at an occurrence of at least one of an ON operation and an OFF operation of an ignition switch of said vehicle.

7. A steering system for a vehicle according to claim 6, wherein:
said control circuit means comprises means for restoring a wheel neutral position by driving said motor to thereby restore said road wheels to neutral positions thereof, in response to at least one of said ON operation and said OFF operation of said ignition switch of said vehicle, and
said angle adjusting means comprises said restoring means and means for normally urging said steering handle to its neutral position.

8. A steering system according to claim 6, wherein said steering mechanism is adapted to steer at least front road wheels of the vehicle.

* * * * *

UNITED STATES PATENT AND TRADEMARK OFFICE
CERTIFICATE OF CORRECTION

PATENT NO.   :   5,097,917
DATED        :   March 24, 1992
INVENTOR(S)  :   Serizawa et al.

Page 1 of 2

It is certified that error appears in the above-identified patent and that said Letters Patent is hereby corrected as shown below:

In The Abstract, line 2, change "form" to --from--.

Column 2, line 51, after "21" insert a--,--.

Column 3, line 2, change "$\dot{\theta}h$" to --$\dot{\theta}h$--;
Column 3, line 4, change "$\theta h$" to --$\dot{\theta}h$--.

Column 6, line 53, change "0h" to --$\dot{\theta}h$--;
Column 6, line 54, change "0h" to --$\dot{\theta}h$--.

Column 9, line 31, change "acceleration " to --acceleration $\ddot{y}$--;
Column 9, line 33, change "$_o$ is" to --$\ddot{y}_o$--;
Column 9, line 35, change "is" to --$\ddot{y}$ is--;
Column 9, line 39, change "$_o$ and" to --$\ddot{y}_o$ and--;
Column 9, line 39, change "acceleration ." to --acceleration $\ddot{y}$.--;
Column 9, line 62, change "is" to --$\ddot{y}$ is--;
Column 9, line 64, change "$_o$ is" to $\ddot{y}_o$ is--;

Column 10, line 1, change "$\Delta$" to --$\Delta\ddot{y}$--;
Column 10, line 2, change "$_o$" to --$\ddot{y}_o$--;
Column 10, line 3, change ";" to --$\ddot{y}$;--.

UNITED STATES PATENT AND TRADEMARK OFFICE
CERTIFICATE OF CORRECTION

PATENT NO. : 5,097,917
DATED     : March 24, 1992
INVENTOR(S) : Serizawa, et al.

It is certified that error appears in the above-indentified patent and that said Letters Patent is hereby corrected as shown below:

Column 11, line 18, change "OFF" to   --OFF operation--.

Signed and Sealed this

Twenty-eighth Day of September, 1993

Attest:

BRUCE LEHMAN

Attesting Officer        Commissioner of Patents and Trademarks